(12) United States Patent
Clinton et al.

(10) Patent No.: US 7,110,358 B1
(45) Date of Patent: Sep. 19, 2006

(54) METHOD AND APPARATUS FOR MANAGING DATA TRAFFIC BETWEEN A HIGH CAPACITY SOURCE AND MULTIPLE DESTINATIONS

(75) Inventors: David Joseph Clinton, Germantown, MD (US); Jonathan David Loewen, Belcarra (CA); Jeff Dillabough, Belcarra (CA); Minette Ashley Dannhardt, Vienna, VA (US)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/580,532

(22) Filed: May 26, 2000

Related U.S. Application Data

(63) Continuation-in-part of application No. 09/574,305, filed on May 19, 2000, now Pat. No. 6,798,744, which is a continuation-in-part of application No. 09/569,763, filed on May 12, 2000, now abandoned.

(60) Provisional application No. 60/136,680, filed on May 28, 1999, provisional application No. 60/134,959, filed on May 19, 1999, provisional application No. 60/134,119, filed on May 14, 1999.

(51) Int. Cl.
*G06F 11/00* (2006.01)
*H04L 12/28* (2006.01)

(52) U.S. Cl. ............... 370/235; 370/329; 370/395.4; 709/224

(58) Field of Classification Search .......... 370/230, 370/232, 235, 236.1, 238.1, 329, 335, 337, 370/346–355, 363, 368, 371, 387, 394–412, 370/417, 233, 468; 709/235, 249, 224, 303, 709/318
See application file for complete search history.

(56) References Cited

U.S. PATENT DOCUMENTS

| | | | |
|---|---|---|---|
| 5,155,825 A | | 10/1992 | Moughanni et al. |
| 5,260,978 A | | 11/1993 | Fleischer et al. |
| 5,319,633 A | | 6/1994 | Geyer et al. |
| 5,473,693 A | | 12/1995 | Sprunk |
| 5,633,858 A | | 5/1997 | Chang et al. |
| 5,642,152 A | | 6/1997 | Douceur et al. |
| 5,671,745 A | | 9/1997 | Park et al. |
| 5,715,165 A | | 2/1998 | Luh et al. |
| 5,781,535 A | | 7/1998 | Russ et al. |
| 5,898,669 A | * | 4/1999 | Shimony et al. ............ 370/232 |
| 6,002,668 A | * | 12/1999 | Miyoshi et al. ............. 370/232 |
| 6,501,762 B1 | * | 12/2002 | Pillar et al. ................. 370/412 |
| 6,859,829 B1 | * | 2/2005 | Parupudi et al. ........... 709/224 |

OTHER PUBLICATIONS

Tian, Yuxing. *A Survey on Connection Admission Control in ATM Networks*. DePaul University, Chicago, IL. 9 pages.
US 5,699,349, 12/1997, Russ et al. (withdrawn)

* cited by examiner

*Primary Examiner*—Afsar Qureshi
(74) *Attorney, Agent, or Firm*—Stephen J. LeBlanc; Quine Intellectual Property Law Group, P.C.

(57) ABSTRACT

A method or system or apparatus provides improved digital communication. In one aspect, destination scheduling is performed by scheduling polling rather than scheduling data emissions. In particular aspects, a loop port scheduler assigns a weight and sequence number to each destination and scheduling polling of ports using these parameters.

22 Claims, 2 Drawing Sheets

| Port Speed Range | Logarithmic Weight |
| --- | --- |
| > 40Mb/s | 0 |
| 20Mb/s – 40Mb/s | 1 |
| 10Mb/s – 20Mb/s | 2 |
| 5Mb/s – 10Mb/s | 3 |
| 2.5Mb/s – 5Mb/s | 4 |
| 1.2Mb/s – 2.5Mb/s | 5 |
| 500Kb/s – 1.2Mb/s | 6 |
| < 500Kb/s | 7 |

Loop Port Scheduling Weights

FIG. 3

METHOD AND APPARATUS FOR MANAGING DATA TRAFFIC BETWEEN A HIGH CAPACITY SOURCE AND MULTIPLE DESTINATIONS

CROSS REFERENCE TO RELATED APPLICATIONS

This application is a CIP of Ser. No. 09/574,305 dated, May 19, 2000, now U.S. Pat. No. 6,798,744 which is a CIP of Ser. No. 09/569,763 dated May 12, 2000 ABN, which claims benefit of 60/134,119 dated May 14, 1999 and claims benefit of 60/134,959 dated May 19, 1999 and claims benefit of 60/136,680 dated May 28, 1999.

Each of these applications are incorporated herein by reference.

FIELD OF THE INVENTION

The present invention is related to the field of digital communications. More specifically, the present invention is directed to methods and/or systems and/or apparatuses for scheduling data traffic from a high capacity source to a number of lower capacity destinations.

BACKGROUND OF THE INVENTION

In a DSLAM system and other data transfer systems, data may be sent from a higher-speed or higher-capacity data source to a large number (potentially thousands) of lower-capacity destinations. In some systems, a traffic management device is responsible for distributing this data to destinations across a shared communication channel, such as a shared data bus. In some types of systems, each destination can have wide ranging data rates (such as ranging from 23 Kbps to 52 Mbps) and data rates for some destinations can change in real time. A large number and varying data rates of destinations can make scheduling data efficiently and fairly challenging without greatly increasing hardware size and power.

In DSLAMs and similar systems, some architectures require per port transmission FIFO's, which can be costly to implement in terms of power and size.

Another proposed solution in ATM and other systems is to shape the downstream traffic on a per destination (or per port) basis. This per port shaping function shapes the aggregate traffic to each loop port's actual data rate, thus eliminating the need for any further scheduling. However, solutions using per port traffic shaping often must adjust the shaping rate in real time each time the loop port changes rates. Due to the latency between the loop port data rate changing and the traffic shaper rate changing, there must be a mechanism to ensure the PHY buffer in the loop port is not overflowed. To do this the shaper rate must be less then the actual loop port rate since the two rates are not synchronized. The rate difference represents a loss in throughput bandwidth.

Another solution in ATM-type systems is to extend the UTOPIA Level 2 (UL2) standard to support a large number of ports. This involves polling all ports, collecting and prioritizing their responses, and then sending data to the selected loop port. Solutions that try to extend the current UTOPIA Level 2 standard suffer from the UL2 limitations of: (1) There is no inherent mechanism for port weighting. All ports would have to be polled at a rate to satisfy the fastest loop port. (2) UL2 is not intended to support aggregate port bandwidth greater then the UL2 bus bandwidth. (3) The UTOPIA Level 2 standard supports 31 ports; to scale UL2 to a large number of ports would require more polling bandwidth and additional pins. For example, scaling linearly for 2 k loop ports results in 64 poll status pins carrying very little useful information.

Prior Patents and Publications or other Relevant Materials

The following patents and publications may be related to the invention or provide background information. Listing of these references here should not be taken to indicate that any formal search has been completed or that any of these references constitute prior art. References include:
Transwitch Cubit based DSLAM design
Motorola 860SAR based DSLAM design
IgT WA C-185/186/187/188 based DSLAM design
PMC-980448, ATM Traffic Manager Device Telecom Standard Product Engineering Document
PMC-980929, APEX Loop Port Scheduler

GLOSSARY

The following is a list of terms and abbreviations according to specific definitions as understood in the art. Listing of these terms here is intended to help the reader in understanding various aspects of the present discussion, but is not intended to limit other meanings for certain terms as they may be used or understood by practitioners in the art.

AAL5 . . . ATM Adaptation Layer 5
ADSL . . . Asymmetric Digital Subscriber Loop
ADSL.lite . . . Splitterless Asymmetric Digital Subscriber Loop
Any-PHY . . . A super set UTOPIA and POS-PHY interconnect definition
APEX . . . ATM switch providing COS queuing/scheduling, shaping, and congestion management across 2 k ports targeted at DSLAM applications.
ATLAS . . . Next Generation 622 Mbps ATM Layer Solution: Address Translation, Policing and OAM
ATM . . . Asynchronous Transfer Mode
Delay Variation . . . Variance in traffic delay with respect to the nominal latency
DownStream . . . towards the access or DSLs
DSL . . . Digital Subscriber Loop
DSLAM . . . Digital Subscriber Loop Access Multiplexer
DUPLEX . . . DSLAM line card traffic aggregator and flow control manager
EPD . . . Early Packet Discard—the process of discarding all the cells of an AAL5 packet given the anticipation of congestion
FR . . . Frame Relay
GCRA . . . Generic Cell Rate Algorithm
HCS . . . Header Check Sum
HDSL . . . High Speed Digital Subscriber Loop
ICI . . . Ingress Connection Identifier
OAM . . . Operations, Administration, and Maintenance
PCR . . . Peak Cell Rate
PHY . . . Physical layer
PPD . . . Partial Packet Discard—the process of discarding the remainder of the cells of an AAL5 packet once a cell of an AAL5 packet has been discarded
SAR . . . Segmentation and Reassembly
SCR . . . Sustained Cell Rate
SDSL . . . Symmetric Digital Subscriber Loop
Shape Rate . . . The rate at which the traffic is shaped to.
TC . . . Transmission Convergence
Traffic Latency . . . Processing and/or transmission delay of traffic (cells or packets in this context).

Traffic Management . . . Managing traffic from a queuing, scheduling, and congestion control perspective.

Traffic Shaping . . . The process of emitting traffic (cells for ATM) at a specified rate—the shape rate.

UpStream . . . towards the WAN

UTOPIA . . . Universal Test and Operations Interface for ATM

VC . . . Virtual Connection

VCC . . . Virtual Channel Connection

VCI . . . . Virtual Channel Identifier

VDSL . . . Very High Speed Digital Subscriber Loop

VORTEX . . . DSLAM core card traffic aggregator and flow control manager

VPC . . . Virtual Path Connection

VPI . . . Virtual Path Identifier

WAN . . . Wide Area Network xDSL . . . Any Digital Subscriber Loop variant

ChannelID . . . is the modem channel identifier relative to the VORTEX it is connected through.
  It is comprised of the HSSID, and PHYID. A VORTEX maps ChannelIDs and VORTEX base addresses to PortIDs.

HSSID[n:0] . . . the serial link number within the selected VORTEX. n=2 in the current version of the VORTEX.

PHYID[m:0] . . . the channel number within the selected serial link. m is register configurable on a per serial link basis and is $\leq 5$.

PollingAddress . . . the 11 bit address driven from the APEX to the VORTEXs. It carries the PortID being polled.

PortActive . . . bit per port asserted if at least one cell is queued in that port PortID . . . is the APEX loop port identifier. An 11-bit number identifying 1 of the 2 k APEX loop ports.

TPA . . . Transmit Packet Available. A signal returned from a polled port that indicates that the port is able to accept a data unit (packet or cell).

SUMMARY

The present invention, in various embodiments, involves a data transfer management system and/or method for scheduling transmission of data units (or cells) to a number of destinations (such as loop port terminations). A particular application is a DSLAM architecture as described in the documents referenced above, particularly provisional patent application 60/134,119 referenced above. However, it will be apparent from the teachings provided herein that data transmission scheduling according to the invention can be used in other types of logical systems.

In specific embodiments, the present invention, rather than scheduling data transfer to destinations (herein destinations may also be referred to as ports), schedules the polling of destinations to determine destination availability to accept data and then emits data to destinations with successful polls.

In specific embodiments, the invention can use weighted interleaved round robin (WIRR) scheduling in conjunction with a weight spreader function to schedule polling. In a further aspect, polling bandwidth is minimized by only polling ports that have data queued and have a high probability of being able to accept data. Ensuring a high probability in specific embodiments is accomplished by having application software set a polling interval for a port that tends to ensure that a port will only be chosen for polling after a sufficient interval has elapsed in which it will be likely that the port would have completely accepted any data transmitted after a previous poll. Application software in various embodiments can adjust the poll interval based on detecting and changing the speed of a particular port, or, in some embodiments, based on detected repeated underruns at a loop port.

In various specific embodiments, various aspects according to the invention provide:

1. Effective scheduling for a large number of destinations (for example, up to 2 k loop ports in a particular embodiment).
2. Support for a wide range of per-port data rates. In a specific application, for example, data rates between about 32 Kbps and 52 Mbps.
3. Fairly distributed bandwidth among ports given that aggregate port bandwidth may be greater than a shared channel bandwidth and ensuring that if maximum bandwidth is exceeded, no one port is penalized substantially more than any other port.
4. Minimized delay variation and underflow.
5. Even distribution of the available bandwidth allotted to port's of similar rates (e.g. avoiding spikes/bursts when ports of the same rate always want data at the same time).
6. Fair (according to port weight) distribution of the polling of populated ports in time, without restricting which of the ports are populated.
7. Fair (according to port weight) distribution of the polling of populated ports in time, without restricting port population according to port rate.
8. Minimized polling bandwidth and pin requirements between the port scheduler and the port devices.

The invention may be used in applications that require an efficient, even, and fair distribution of bandwidth to a high number of destinations. Ports as used herein can be understood generally to represent any logical termination or destination of a data unit or data stream. In one embodiment, the invention may be used in an APEX architecture as described in the above referenced documents to schedule the polling of 2 k loop ports in a downstream direction. Ports in this embodiment can generally be understood as modems or other physical device interfaces or as a virtual channel.

The present invention may also be incorporated into a communication system or communication network to facilitate the transmission of data from a high-capacity source over a shared channel to a number of lower-capacity destinations.

A further understanding of the invention can be had from the detailed discussion of specific embodiments and specific products incorporating aspects of the invention below. For purposes of clarity, this discussion refers to devices, methods, and concepts in terms of specific examples. However, the method of the present invention may operate with a wide variety of types of devices. It is therefore intended that the invention not be limited except as provided in the attached claims.

Furthermore, it is well known in the art that logic systems can include a wide variety of different components and different functions in a modular fashion. Different embodiments of a system can include different mixtures of elements and functions and may group various functions as parts of various elements.

For purposes of clarity, the invention is described in terms of systems that include many different innovative components and innovative combinations of components. No inference should be taken to limit the invention to combinations containing all of the innovative components listed in any illustrative embodiment.

For the sake of clarity, the invention will be explained herein with respect to specific embodiments, in some cases including specific numbers of buffers, communication lines, or other components. It will be clear to those of skill in the art that the invention may be deployed in many alternative logic applications. The invention may also be deployed as described below for operation of a wide variety of communications devices, including devices that use various types of packet protocols rather than cell protocols. For the sake of clarity, the invention will be described in terms of specific examples. It is inherent in the art that logic devices and processes and communications devices can be highly variable in the arrangement and configuration of different components. Described examples should therefore been taken as illustrations and not seen as limiting the invention and the invention should not be limited except as provided by the attached claims and allowable equivalents.

In order to facilitate description, the following discussion will describe the present invention in terms of particular methods and architectures for providing scheduling services, particular in a DSLAM environment but also applicable to other communications systems. It will be understood to those of skill in the art, however, that various innovative communication methods and devices according to specific embodiments of the invention may be used in other communication schemes. The invention should therefore not be taken as limited except as provided in the attached claims.

All publications, references, patents, and patent applications cited herein are hereby incorporated by reference in their entirety for all purposes.

BRIEF DESCRIPTION OF THE DRAWINGS

FIG. 3 illustrates scheduling weights for particular port speeds as an example according to specific embodiments of the invention.

DESCRIPTION OF SPECIFIC EMBODIMENTS

Example Traffic Management Device Architecture

Figure 1:
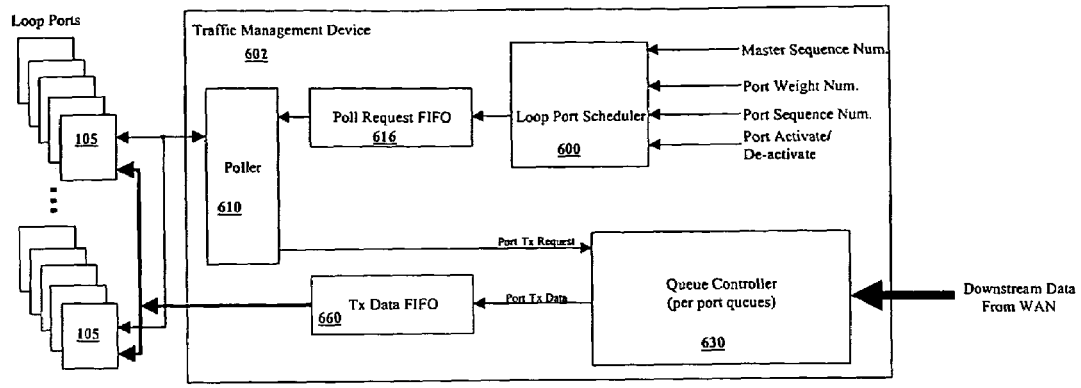
FIG. 1 illustrates an example traffic management module according to specific embodiments of the invention.

FIG. 1 illustrates an example traffic management module according to specific embodiments of the invention. As shown in the figure, an example traffic management device 602 according to the invention includes a poller 610, for issuing poll requests to a plurality of destinations (such as port terminations 105). A loop port scheduler (LPS) 600 issues poll requests to poller 610 via Poll Request FIFO 616. A specific example process for selecting scheduled ports is discussed in the following section. Poller 610 uses the PortIDs from the Poll Request FIFO 616, to poll ports looking for asserted port available signals (TPAs) to which cells may be transmitted.

Poller 610 polls the requested loop port. If the loop port responds to the poll with status indicating it can accept data (e.g. responds with an active TPA), then the Poller issues a transmit data request for that port to the Queue Controller 630. The Queue Controller maintains per port queues of downstream data from the WAN. Since each port is polled prior to a transmit data request being issued, head-of-line blocking is avoided and there is no need to have individual port output FIFOs. The Queue Controller sends the data for the requested port to the shared Tx Data FIFO 660. This data is then sent to the destined loop port.

In a further specific embodiment, a traffic manager according to the invention, can achieve the following:
1. Maximize bus utilization.
2. Maintain relative fairness among ports. If bus maximum bandwidth is exceeded no one port is penalized more than any other port.
3. Use only one transmit data FIFO that is shared among all ports.
4. Minimize delay variation and underflow to ports.
5. Evenly distribute bandwidth allotted to port's of similar rates.
6. Avoid spikes/bursts: (i.e. Ports of the same rate always wanting data at the same time).
7. Port priority is not tied to its physical port number.
8. No physical port numbers are reserved as high priority ports.
9. Place no restrictions to which ports are actually populated.
10. Minimize polling bandwidth and pin requirements between the Traffic Management Device and the loop port devices.
11. Allow port parameters to be reconfigured on the fly without taking the port or scheduler offline.

As can be seen in FIG. 1, rather than scheduling or shaping cell emissions between the traffic manager and loop ports, traffic management according to the present invention schedules the polling of ports and emits cells to ports with successful polls.

Other features of various specific embodiments can include: (a) weighted fair polling distribution mechanism; (b) parallel processing of 32 ports at a time; (c) scheduler can search 2 k ports in 64 cycles; (d) each port poll scheduled requires 1 cycle; (e) specific implementations have power savings features; (f) only read weight and sequence rams after determining that a port has data queued (e.g. PortActive is asserted) in order to conserve power; (g) last port detector enhances algorithm performance; (h) a port's parameters (e.g. weight and sequence numbers) can be reconfigured without taking the port offline. The traffic manager will adapt to these new parameters the next time it evaluates the port. This is important in some communication systems because loop ports may frequently change data rates.

Example Loop Port Scheduler (LPS) Architecture

Figure 2:
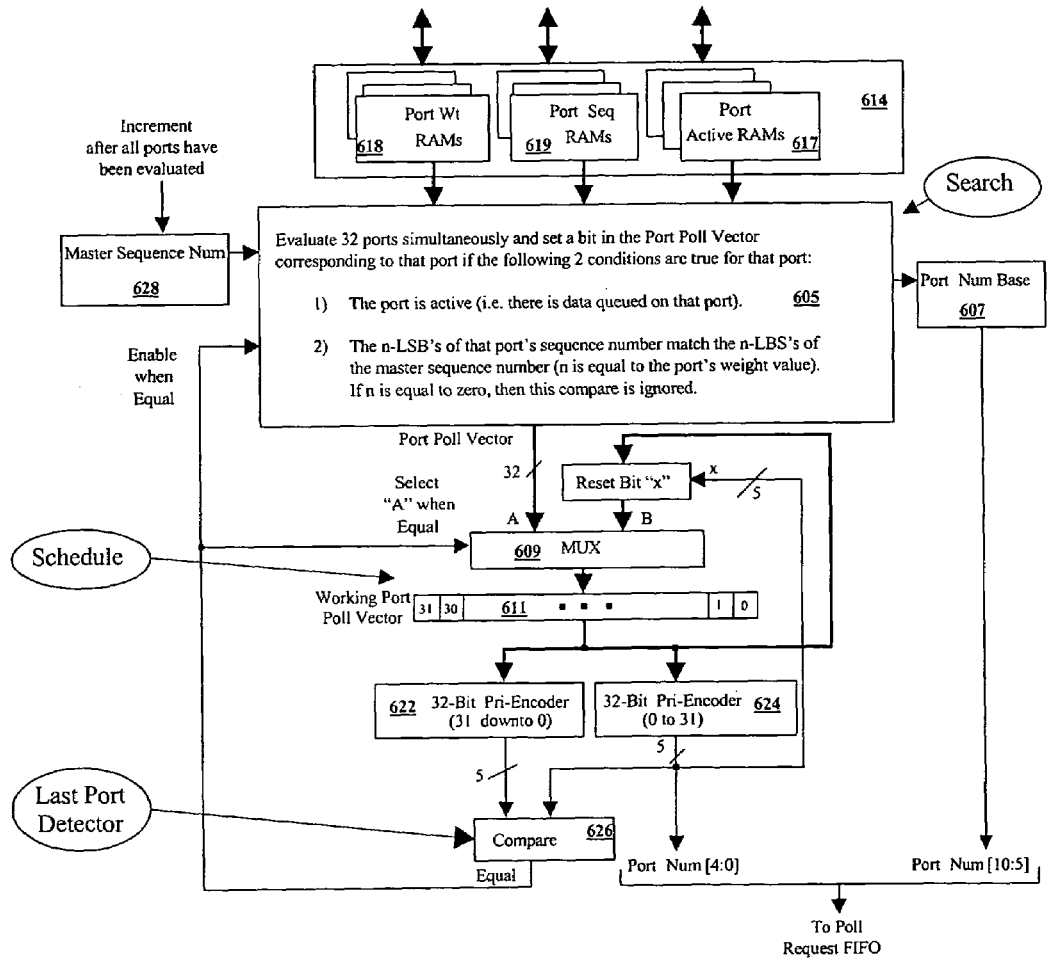
FIG. 2 is a block diagram showing an example loop port scheduler implementation according to specific embodiments of the invention.

FIG. 2 is a block diagram showing an example loop port scheduler implementation according to specific embodiments of the invention. In this example, to increase scheduling efficiency, 32 ports are evaluated in parallel. The LPS minimizes the required polling bandwidth by adhering to the following: (1) Only ports that have data queued in Queue Controller 630 are eligible to be polled. (2) Avoid polling a port when the port can not accept new data. This is accomplished by relating the port's poll rate with the port's actual data rate. As a guideline for application software establishing initial weight values, a port generally should not be polled more often then twice its data rate unless there is excess poll bandwidth. Application software in a communication system will be responsible for initial modem rate setup and for changing rates after detecting modem speed changes. Driver software generally residing on the traffic management device is responsible for both determining an appropriate distribution for sequence numbers in various weights and assigning sequence numbers to ports. When necessary, the driver software will also reassign sequence numbers when distribution of ports in weight groups becomes significantly unbalanced due to port deactivations.

In order to distribute polling bandwidth efficiently and fairly among ports, the following scheduling algorithm may be used in specific embodiments of the invention when selecting a port to poll:

Each port is assigned a 3-bit logarithmic weight (LW) value defining the relative rate of the port. A port's relative weight (RW) is calculated as $RW=2^{(7-LW)}$, providing eight discrete relative weights between 1 and 128. The LW value is used to determine how frequently a port is polled.

Each port is assigned a 7-bit sequence value (which may also be referred to as a sequence number or a poll sequence identifier). Ports that share the same weight value should be assigned an even distribution of sequence values. This sequence value is used to distribute the polling of ports of the same weight evenly over time.

The LPS maintains a 7-bit master sequence number 628. The LPS monotonically cycles through 128 numbers in sequence. The master sequence counter increments once upon each completion of a polling sequence, counting linearly from 0 to 127, rolling over to 0, and continuing. For each master sequence number, the scheduler evaluates each port based on its eligibility conditions and schedules ports to be polled if both of these conditions are met: (1) There is data currently queued to that port (e.g. the port has its PortActive bit asserted. This condition eliminates wasting polling bandwidth by not polling ports that do not need to be polled.) (2) The n-LSB's of a port's sequence number match the n-LSB's of the scheduler's master sequence value, where n is equal to the port's 3-bit LW value. This condition is ignored when the port's LW value is equal to zero. Thus, if n=0, the port matches every master sequence number; if N=1, the port matches every second MSN; if N=2, the port matches every fourth MSN, etc. In a particular embodiment, therefore, each Polling Sequence can result in anywhere from 0 to the maximum number of supported ports (such as 2048) being determined eligible.

In a further embodiment, an additional requirement is that the port does not have a request for cell retrieval pending. In other words, if a polled port indicated it was able to accept data during a previous poll, and a transmission of data to that port has not been completely sent to the port, a second request to transmit data to that port is not issued. This can either be accomplished by the poller suppressing the poll or by the queue controller suppressing the transmit request.

Driver software in the traffic management device sets Poll Sequence Identifiers such that ports at the same weight are evenly distributed throughout the polling sequences. Having software set the Poll Sequence Identifiers in this manner enables a port of any bandwidth (within the supported range) to be placed on any PortID and still be serviced according to its weight in a fair manner. This provides additional system design flexibility.

Sequencer 605 steps through each port in turn, scanning Sequencing Table 614 identifying loop ports which are eligible for polling and placing PortIDs of eligible ports into Poll Request FIFO 616. In a particular embodiment, when FIFO 616 becomes full, the sequencer stops and waits. It continues when FIFO 616 becomes not full.

Sequencing Table 614

In a specific example embodiment, storage of LW and Poll Sequence Identifier and status information about ports can be understood as stored in a Sequence Table 614, which in a specific example embodiment can be understood as containing eleven bits per port: 3 bits for the Polling Weight, 7 bits for the Poll Sequence Identifier, and 1 bit indicating PortActive (indicating that there is available to be transmitted to a port). Software configures the Port Weight and the Poll Sequence Identifier. The Queue Controller 630 updates the PortActive bit. In a specific example embodiment, Sequencing Table 614 can be understood as a number of separate memory blocks (such as RAMS).

In a specific embodiment, a stored PortActive may actually be several bits (such as four, one for each possible class of services). However, from the point of view of the scheduler as herein described, these bits may be ORd together, effectively prodicing a single active/not_active signal.

The PortActive RAM 617 effectively contains a PortActive bit for each port. This memory effectively has 2 interfaces, a r/w interface used by the Queue Controller to update the status bits based on active data in the queue and a read interface used by the Sequencer.

The Port Weight RAM 618 contains port weight values for each port. It has two interfaces, a r/w interface used by software to update Port Weight when necessary and a read interface used by the Sequencer. Updates of this memory block by software are typically required only when a new line card is provisioned. Updates may also be required when modems retrain to a significantly different line rate, moving the modem into a different weighting group.

The Port Sequence RAM 619 contains the port sequence values. It has two interfaces, a r/w interface used by software to update port Sequence Identifiers, and a read interface used by the Sequencer. Updates by software are typically required only when a new line card is provisioned. Updates may also be desired when modems retrain to a significantly different line rate, moving the modem into a different weighting group and possibly requiring a new distribution of port sequence values. In particular embodiments, sequence numbers and weights may be modified at any time during system operation.

Poll Request FIFO 616

The Poll Request FIFO is a two interface FIFO containing PortID numbers. The write interface is updated by loop port scheduler 600. The read interface is used by poller 610.

Based on particular system design, if LPS 600 can complete a poll sequence within the average time it takes to retrieve a cell from a queue, the weighting structure guarantees that the LPS will not cause a transmit cell opportunity to be missed.

In a particular example embodiment, the average time to retrieve a cell is expected to be about 80 sysclk cycles. For 2 k ports, this would require the LPS to scan 2048/80 or approximately 25 ports per sysclk cycle, implying, for 1-bit entries, a 275-bit wide Sequence Table RAM. While this may be more than is necessary in some applications, it does put an upper bound on the Sequence Table width.

The Poll Request FIFO must be shallow enough so the information within it does not become stale, creating unfairness between ports; yet it must be large enough to ensure that it rarely under-runs. However, it may underrun if the Sequencer requires more time to find the next eligible port then it takes for the Poller to empty the Poll Request FIFO. Under-running results in no polling actions, which can result in missed transmit cell opportunities.

Parallel Port Evaluator

FIG. 2 is a block diagram showing an example loop port scheduler implementation according to specific embodiments of the invention. In this particular example embodiment, a number of ports are evaluated at the same time (such as 32). While other very different implementations according to the invention are possible, this particular design is included for completeness of the disclosure to disclosure possibly preferred embodiments and to describe further independently innovative aspects. FIG. 2 can be viewed as either a circuit block diagram or as a operational block diagram illustrating a method according to the invention.

FIG. 2 operates as follows. A search is performed in parallel searcher 605 to select ports for polling. To perform this search, 605 reads master sequence number 628 and examines data stored for 32 port ids.

In particular embodiments, ports that do not have transmit data pending indicated by the PortActive RAM 617 are not selected.

Ports with non-zero port weights whose sequence number, as stored in 619, do not match a specified number of bits of the MSN also are not selected. In particular embodiments, the n bit compared are the n LSBs of the MSN. The number of bits compared is determined by the weight value as stored in 618. Ports with zero port weights as stored in 618 are always selected.

The value of the LSBs of those ports that are selected (in a specific embodiment, five bits) are then encoded into a poll port vector (PPV). In specific embodiments, this is simply a 32-bit vector, with active bit positions indicating LSBs of ports selected for polling. The remaining MSBs of ports selected (in a specific embodiment, six bits) are output by 605 selector as the port number base 607.

The PPV is output through a multiplexor 609, to a working PPV location 611. From this location, a single PortID is selected to output to the Poll Request FIFO, as follows. The PPV is first output to two priority encoders 622 and 624. Each of these encoders output a single value representative of either the highest value (generally the most significant active bit of the PPV, which is output by 622) or the lowest value (generally the least significant active bit of the PPV, which is output by 624). Typically, this value is output as a multi-bit value (such as five bits). The low value output by priority encoder 624 forms the LSB for the output PortID number and the MSB of the PortID number is formed by Port Base 606. The completed PortID number is placed in the poll request FIFO. This output value is also sent to a reset bit module 628 in order to deselect 1-bit corresponding to the PortID that has been placed in the poll request FIFO.

Priority encoder 622 and comparater 626 are used to determine when the last port bit value in 611 is being output. As indicated, compare 626 determines when the values output by 622 and 624 are equal, which indicates that both the highest and lowest bit positions in 611 are the same, thus indicating that the last bit is being evaluated. As shown, when the values are equal, the equal signal enables 605 to move to a new set of port ids for comparison and to output a new Port Number Base 607. When not equal, searching is halted while the above describe processing takes place. When the values are equal, multiplexer 609 selects the newly output PPV rather than the reset bit logic for placement into the working PPR register 611.

When all portIDs have been evaluated, by 605, MSN 628 is incremented and an evaluation of all ports is done again. Determination that all ports have been evaluated and therefor to increment the Master Sequence Number can be detected in a number of ways, such as by detecting when a Port Number Base 607 is at a maximum value.

FIG. 3 shows an example of how software may use logarithmic weights in a desired relationship in a particular embodiment between the weights and the port line speed. These values are examples only and will vary in different circuit implementations.

From the teachings herein, it will be seen that according to various aspects of specific embodiments of the invention:

1. The LPS provides a method of distributing data to a large number of ports over a shared data bus using a single output FIFO while maintaining fairness and reducing head-of-line blocking without using extreme clock rates.
2. The LPS schedules port polling requests instead of cell emissions.
3. The weighted fair polling distribution mechanism minimizes polling bandwidth, spreads polls to reduce bursts, and makes efficient use of the shared data bus.
4. A port's parameters (i.e. weight and sequence numbers) can be reconfigured without taking the port offline. The LPS will adapt to these new parameters the next time it evaluates the port. This is important in DSLAM systems since loop ports may frequently change data rates.

OTHER EMBODIMENTS

The invention has now been described with reference to specific embodiments, including details of particular circuit implementations incorporating aspects of the invention. Other embodiments will be apparent to those of skill in the art. In particular, methods according to the invention can be used in a wide variety of communications applications different from those illustrated herein.

In particular, while the present invention has particular applications in scheduling DSLAM loop ports, the invention can also be used for scheduling low speed framers or PHY devices such as T1, E1, J1, J2, ATM25, E3, or DS3 devices.

Furthermore, the total number of ports supported can be varied based on the target application; the total number of weight values and sequence numbers used can be varied based on the target application's performance requirements; and when implementing LPS, the number of ports that are evaluated in parallel can be varied based on hardware limitations or capabilities and performance requirements.

It is understood that the examples and embodiments described herein are for illustrative purposes and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A method of scheduling data transmission from a source to a plurality of destinations comprising:
    performing weighted scheduling of polling to destinations;
    assigning each destination a logarithmic weight value defining the relative rate at which the destination will be eligible to be polled;
    wherein a destination's relative weight is equal to two raised to the maximum logarithmic weight minus said assigned logarithmic weight; and
    transmitting data to destinations with successful polls using a shared transmit data buffer.

2. The method according to claim 1 further comprising:
    using weighted interleaved round robin scheduling in conjunction with a weight spreader function to schedule polling.

3. The method according to claim 1 wherein said scheduling maintains fairness and reduces head-of-line blocking.

4. The method according to claim 1 further comprising:
assigning a weight value to help ensure that polled destinations have a high probability of being able to accept data.

5. The method according to claim 1 further comprising: only polling destinations for which data is pending for transmission.

6. The method according to claim 1 further comprising:
assigning each destination a sequence value, with destination of the same weights being assigned to a roughly evenly distributed sequence values so that said sequence values evenly distribute polling of destinations of the same relative weight.

7. The method according to claim 6 wherein said scheduling does not require a particular assignment of destination identifications because sequence numbers are assigned independently of a destination identification.

8. The method according to claim 1 further comprising:
using a scheduler to cycle through a numerical sequence;
wherein a destination is eligible for polling if the destination has data queued and if a number n of LSBs of the destination sequence match the n LSBs of the master sequence number, where n is the destination's logarithmic weight value or where n equals zero.

9. The method according to claim 1 wherein said scheduling does not require a particular assignment of destination identifications because relative weights are assigned independently of a destination identification.

10. The method according to claim 1 further comprising:
receiving data to a plurality of destinations from a wide area network;
holding said data in queues in a queue controller; and
for destinations with successful polls, transmitting data from said queues to a transmit data FIFO.

11. The method according to claim 10 further comprising:
signaling from said queue controller to a polling scheduler an identification for destinations with pending data.

12. A method of cyclically outputting values encoded by a bit vector comprising:
determining a lowest active bit position value in said bit vector using a priority encoder;
outputting said lowest active bit position value;
feeding back said lowest active bit position value and said bit vector to a reset bit module for removing a bit at said lowest active bit position value; and
repeating said determining, outputting, and feeding back steps on a bit vector with said lowest active bit position reset until a terminal condition is reached.

13. The method according to claim 12 wherein said terminal condition is determined by:
determining a highest active bit position in said bit vector; and
comparing said lowest active bit position and said highest active bit position and when equal signaling that a last bit has been reached.

14. A traffic management device comprising:
a master sequence number that increments when a port selection cycle is completed;
a scheduler that reads polling parameters corresponding to port ids and selects ports for polling based on said parameters;
a poller for issuing polls to ports; and
a queue controller for emitting data units to ports that respond affirmatively to said polls;
wherein said parameters include a port active parameter and wherein ports are not selected if said port active parameters indicates there is no data to send to said port;
wherein ports are not selected if said port sequence parameter does not match a specified number of bits of said master sequence number.

15. The device according to claim 14 wherein said specified number is determined by a port weight parameter.

16. The device according to claim 15 further comprising:
a poll request FIFO for holding port ids of ports selected for polling.

17. The device according to claim 15 further comprising:
a transmit data FIFO for holding data to be transmitted to ports with successful polls.

18. The device according to claim 15 further comprising:
a queue controller with per port FIFOs for holding data yet to be scheduled for transmission to ports with successful polls.

19. A computer readable medium containing computer interpretable instructions describing a circuit layout for an integrated circuit that, when constructed according to said descriptions, will configure a circuit to embody the apparatus described in claim 14.

20. A communication device comprising:
an ATM up-link module providing centralized traffic management for a plurality of access line cards;
a plurality of access line modules for connecting to a plurality of destinations;
an engine for per port flow control and cell emission scheduling of downstream traffic; and
a polling sequencer comprising:
a sequencer that scans a sequencing table identifying loop ports which are eligible for polling;
a Poll Request FIFO wherein portIDs of eligible loop ports are placed; and
a poller that uses said portIDs from said Poll Request FIFO to poll ports.

21. The device according to claim 20 further comprising:
wherein said polling requests asserted transmit packet available signals indicating ports to which cells may be transmitted.

22. A communications system comprising:
a plurality of loop port modems for exchanging data with a plurality of subscribers;
a traffic management device for handling flow control and traffic management between said plurality of subscribers and a wide-area-network;
a loop port scheduler that scans sequencing parameters, said parameters indicating loop ports that are eligible for polling and identifies port ids of ports eligible for polling;
a poller that uses said port ids to poll ports to detect ports ready to accept data: and
a wide area network interface accepting data from a wide area network into and transmitting said data to ports ready to accept data.

* * * * *